(12) United States Patent
Cardile et al.

(10) Patent No.: US 9,216,644 B2
(45) Date of Patent: Dec. 22, 2015

(54) CAR PROVIDED WITH A VENTILATION CHANNEL

(71) Applicant: Ferrari S.p.A., Modena (IT)

(72) Inventors: Enrico Cardile, Formigine (IT); Alessandro Calamita, Formigine (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 14/457,727

(22) Filed: Aug. 12, 2014

(65) Prior Publication Data
US 2015/0047803 A1  Feb. 19, 2015

(30) Foreign Application Priority Data

Aug. 13, 2013  (IT) .............................. BO2013A0464

(51) Int. Cl.
*B60K 11/08*  (2006.01)
*B60H 1/24*  (2006.01)

(52) U.S. Cl.
CPC .............. *B60K 11/085* (2013.01); *B60H 1/241* (2013.01)

(58) Field of Classification Search
CPC ........ B60K 11/00; B60K 11/02; B60K 11/04; B60K 11/06; B60K 11/08; B60K 11/085; B60K 13/00; B60K 13/02
USPC ............................. 180/68.1, 68.2, 68.3, 68.4
See application file for complete search history.

(56) References Cited

U.S. PATENT DOCUMENTS

| 4,976,489 | A | * | 12/1990 | Lovelace | ............. | B62D 35/005 296/180.1 |
| 8,091,516 | B2 | * | 1/2012 | Preiss | ..................... | B60K 11/04 123/41.05 |
| 8,544,583 | B2 | * | 10/2013 | Ajisaka | .................. | B60K 11/08 180/68.1 |
| 8,708,075 | B2 | * | 4/2014 | Maurer | .................. | B60K 11/08 180/68.1 |
| 8,794,363 | B2 | * | 8/2014 | Wolf | ..................... | B60K 11/085 180/68.1 |
| 8,892,314 | B2 | * | 11/2014 | Charnesky | ........... | B60K 11/085 180/68.1 |
| 2008/0257286 | A1 | * | 10/2008 | Harich | ................. | B60K 11/085 123/41.12 |
| 2012/0323448 | A1 | | 12/2012 | Charnesky et al. | | |

FOREIGN PATENT DOCUMENTS

| DE | 10 2008 020 399 A1 | 10/2009 |
| WO | WO 2005/102761 A1 | 11/2005 |
| WO | WO 2007/031344 A1 | 3/2007 |

* cited by examiner

*Primary Examiner* — John Walters
(74) *Attorney, Agent, or Firm* — Dickstein Shapiro LLP

(57) ABSTRACT

Car provided with: at least one radiator; a ventilation channel which houses on the inside the radiator; an aerodynamic duct, which extends between an inlet opening and an outlet opening obtained inside the ventilation channel between the inlet opening of the ventilation channel and the radiator; and a shutter, which is arranged in the area of the inlet opening of the aerodynamic duct and is mounted mobile between an engagement position, in which the shutter closes the inlet opening of the aerodynamic duct, and a disengagement position, in which the shutter leaves the inlet opening of the aerodynamic duct free.

22 Claims, 7 Drawing Sheets

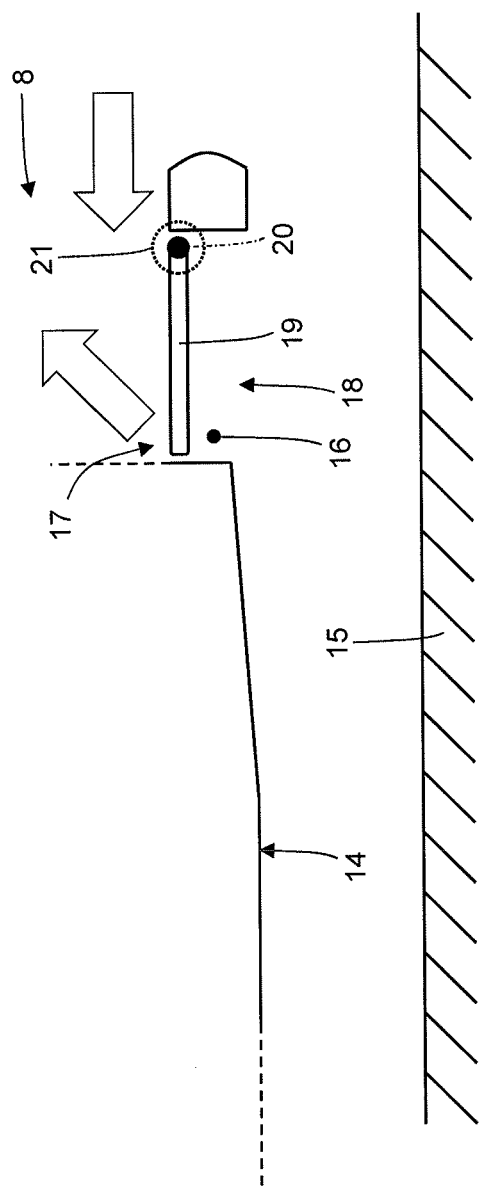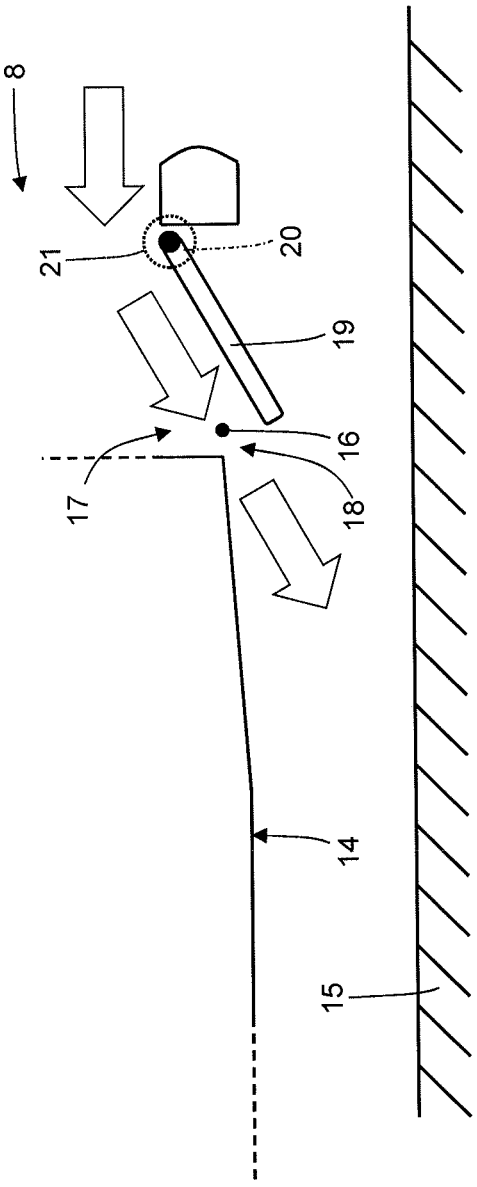

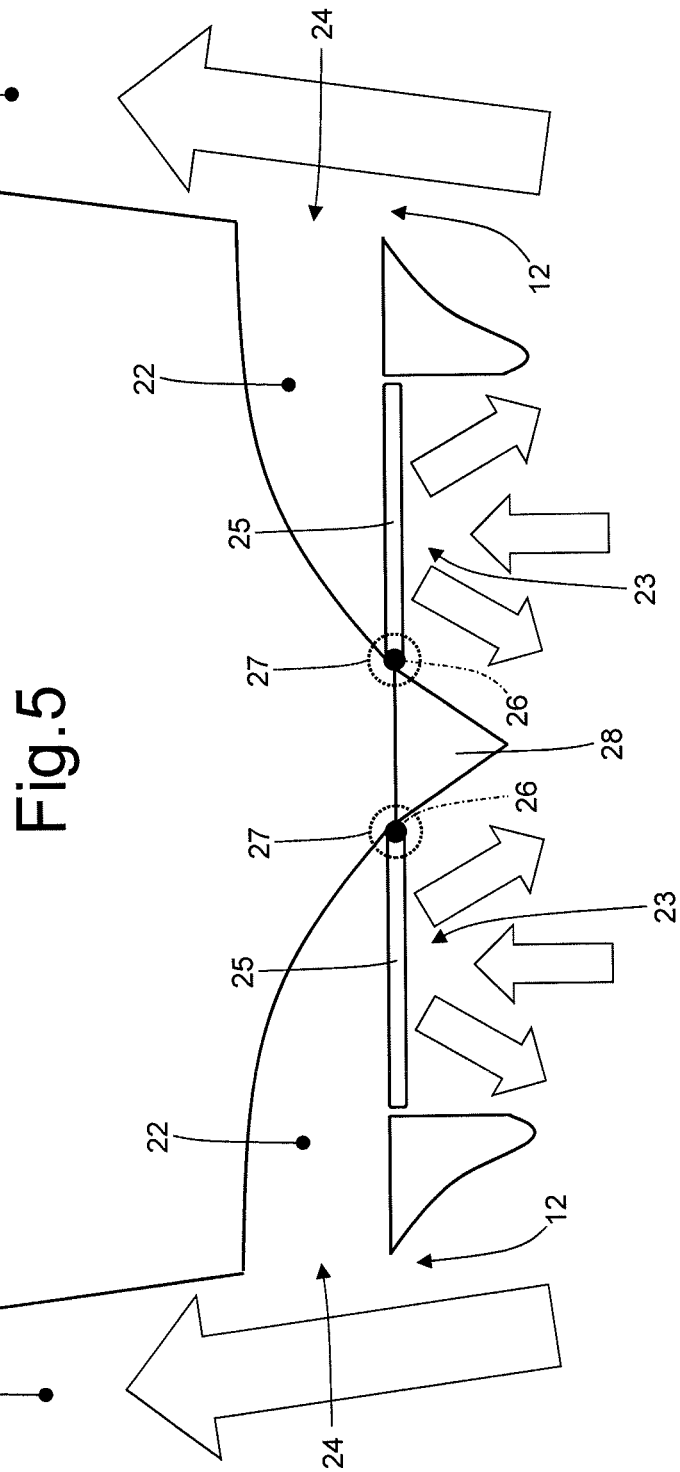

CAR PROVIDED WITH A VENTILATION CHANNEL

TECHNICAL BACKGROUND

The present invention relates to a car provided with a ventilation channel.

PRIOR ART

Currently a high performance car is driven by an internal combustion engine which is provided with cooling circuit having at least one radiator to release the excess heat to the outside. The cooling circuit radiator is normally arranged inside a ventilation channel which extends between an inlet opening (or an air intake) through which fresh air flows in and an outlet opening through which hot air flows out.

It is essential to guarantee the cooling circuit the capacity to adequately cool the internal combustion engine in all conditions and therefore at all speeds; consequently, the dimensions of the inlet opening of the ventilation channel must be big enough to guarantee that an adequate air flow rate circulates through the ventilation channel (and therefore through the radiator) also at low speed (i.e. below 100-120 km/h which, for a high performance car, are modest speeds when compared with the maximum speed which exceeds 300 km/h). In other words, the inlet opening of the ventilation channel must be big enough to guarantee an adequate air flow rate also at low speed.

However, the bigger the dimension of the ventilation channel inlet opening, the greater the aerodynamic drag generated by the ventilation channel; therefore a large inlet opening of the ventilation channel penalizes the aerodynamic drag and thus limits the maximum speed that may be reached by the car. In this regard it should be observed that at high speeds (i.e. above 180-200 km/h), adequate cooling of the internal combustion engine would be guaranteed also in the presence of a relatively small inlet opening of the ventilation channel since, other factors being equal, the air flow rate through the ventilation channel increases proportionally to the speed.

To summarise, the dimension of the ventilation channel inlet opening is always a compromise between the need to guarantee the internal combustion engine adequate cooling at low speed (which requires a large inlet opening) and the need to minimise the aerodynamic drag at high speed (which requires a small inlet opening). Obviously the compromise tries to balance these conflicting needs in the best possible way, but the solution is not optimal for either of said conflicting needs.

The patent application US2012323448A1 describes a car comprising a radiator and two ventilation channels arranged one above the other, each of which conveys towards the radiator fresh air flowing in through a corresponding inlet opening; the inlet opening of the upper ventilation channel is provided with a shutter which is coupled to a front grille and is opened when greater cooling of the radiator is necessary. However, the solution proposed in the patent application US2012323448A1 does not allow low aerodynamic drag values to be obtained at high speed.

SUMMARY OF THE INVENTION

The object of the present invention is to supply a car provided with a ventilation channel, said car being free from the drawbacks described above and, at the same time, easy and inexpensive to produce.

According to the present invention, a car is supplied provided with a ventilation channel, as claimed in the attached claims.

BRIEF DESCRIPTION OF THE DRAWINGS

The present invention will now be described with reference to the attached drawings, which illustrate a non-limiting implementation example thereof, in which:

FIGS. 3 and 4 are two schematic and longitudinal section views of a portion of a front bumper of the car of FIG. 1 with a shutter in two different positions;

FIGS. 5 and 6 are two schematic and horizontal section views of a portion of a front bumper of the car of FIG. 1 with a pair of twin shutters in two different positions.

PREFERRED EMBODIMENTS OF THE INVENTION

Figure 1:
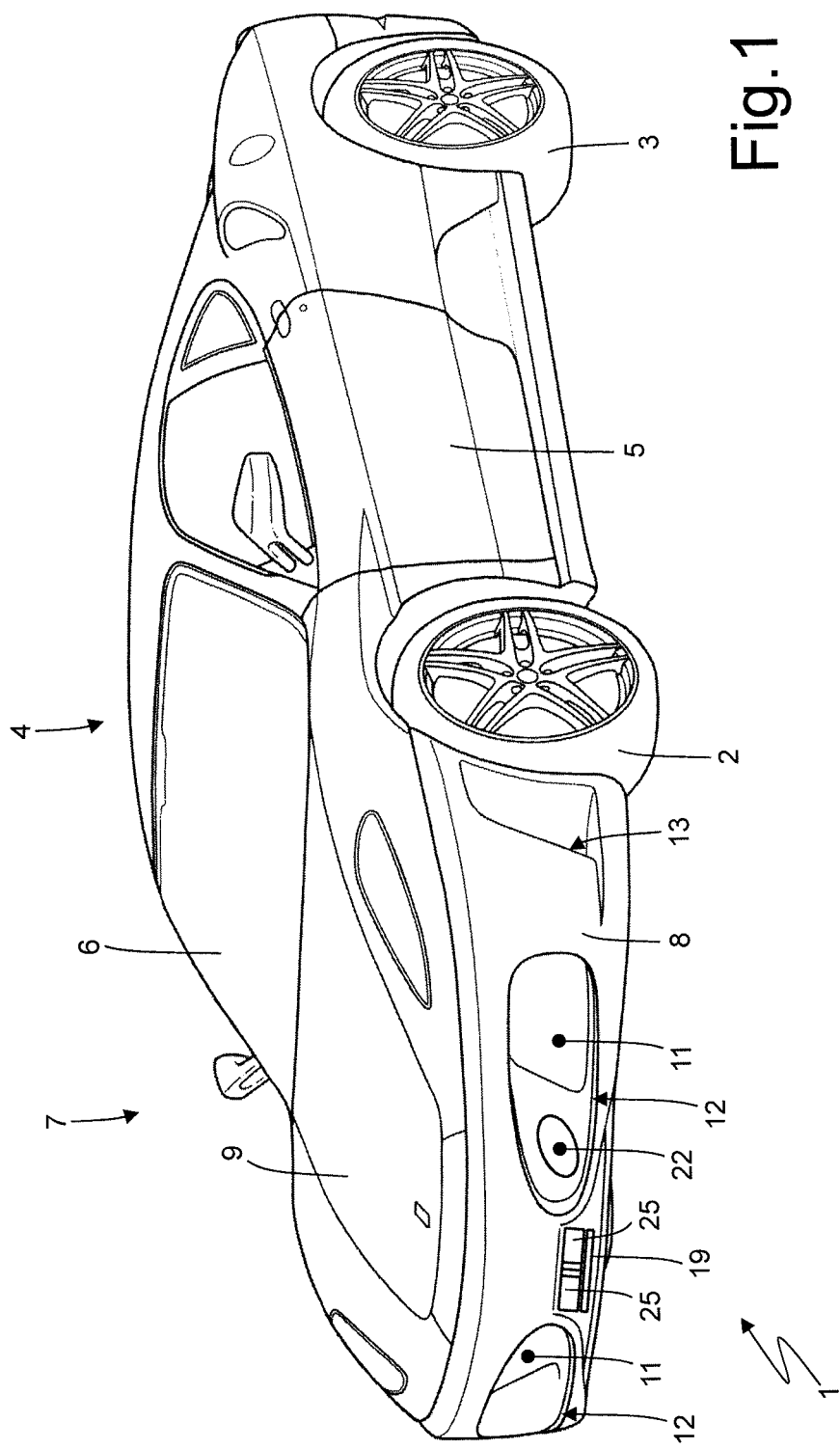
FIG. 1 is a perspective view of a car produced according to the present invention.
Figure 2:
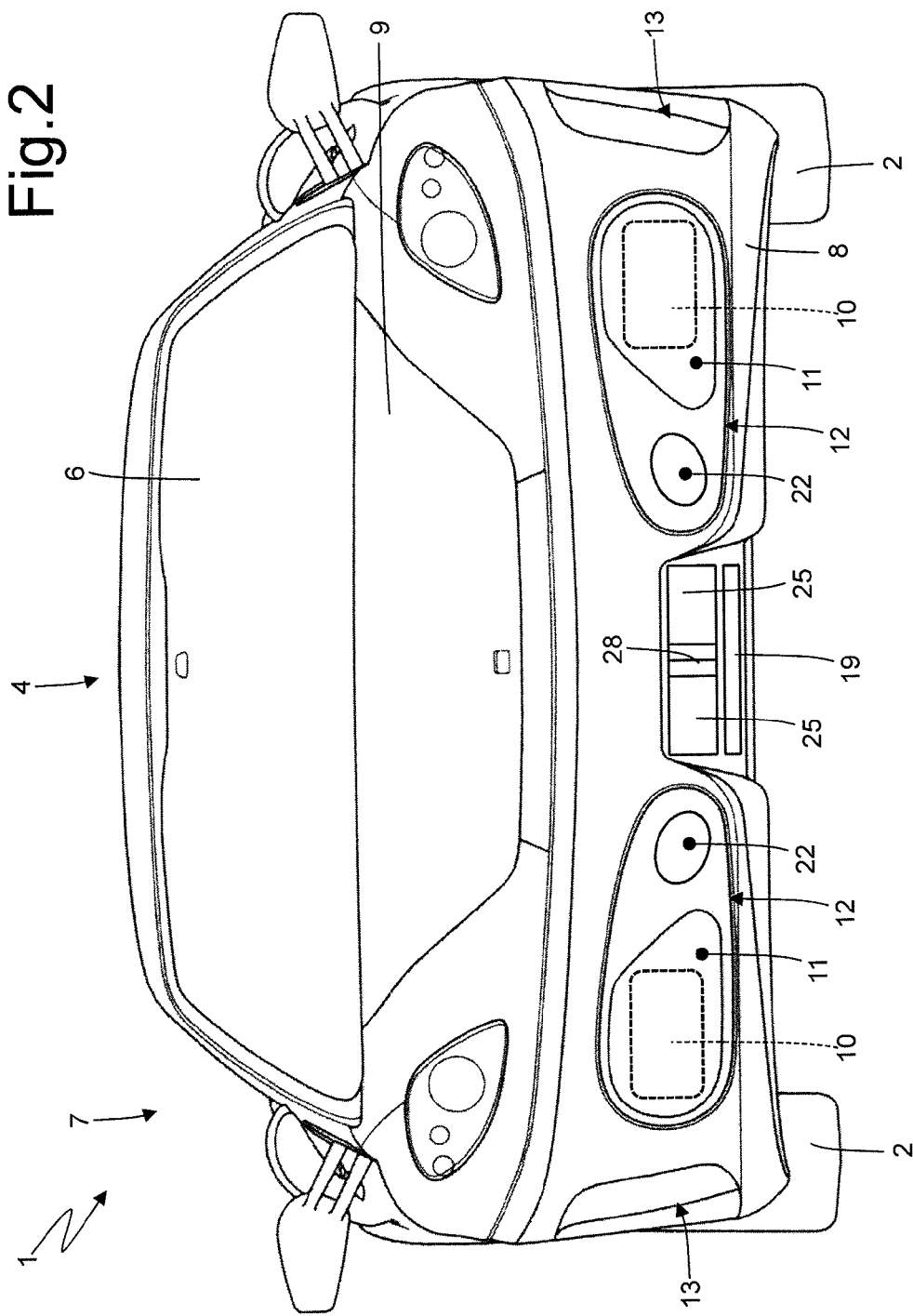
FIG. 2 is a front view of the car of FIG. 1.

In FIGS. 1 and 2, the number 1 indicates as a whole a car driven by an internal combustion engine arranged in a central position. The car 1 comprises a chassis, which supports the internal combustion engine, a pair of front wheels 2, and a pair of rear wheels 3.

Between the front wheels 2 and the rear wheels 3 a passenger compartment 4 is obtained which is accessed via a pair of doors 5; the passenger compartment 4 is delimited at the front by a windscreen 6.

The chassis is covered by a car body 7 which comprises, among other things, a front bumper 8 and a front bonnet 9. The front bonnet 9 is connected at the front to the front bumper 8 and is connected at the back to the windscreen 6.

The car 1 comprises a cooling circuit to cool the internal combustion engine having a pair of radiators 10 (schematically illustrated in FIG. 2), each of which is arranged inside a ventilation channel 11 which extends between an inlet opening 12 (or an air intake) through which fresh air flows in and an outlet opening 13 through which hot air flows out. The inlet openings 12 of the two ventilation channels 11 are obtained at the front through the front bumper 8, while the outlet openings 13 of the two ventilation channels 11 are obtained laterally through the front bumper 8. In other words, each ventilation channel 11 is arranged laterally opposite a corresponding front wheel 2, houses a radiator 10 and extends between an inlet opening 12 obtained at the front through the front bumper 8 and an outlet opening 13 obtained laterally through the front bumper 8.

As illustrated in FIGS. 3 and 4, the car 1 comprises a lower side 14 which delimits the car 1 at the bottom (i.e. is the lower part of the car 1) and faces the road surface 15.

As illustrated in FIGS. 3 and 4, the car 1 comprises an aerodynamic duct 16 which extends between one inlet opening 17, which is arranged at the front so that it is struck by the aerodynamic pressure of the air when the car 1 moves forward, and an outlet opening 18 obtained through the lower side 14 of the vehicle so that it faces towards the road surface 15. Furthermore, a shutter 19 is provided which is arranged in the area of the inlet opening 17 of the aerodynamic duct 16 and is mounted mobile between an engagement position (illustrated in FIG. 3), in which the shutter 19 closes the inlet opening 17 and therefore prevents a flow of air through the aerodynamic duct 16, and a disengagement position (illustrated in FIG. 4), in which the shutter 19 leaves the inlet opening 17 free and therefore allows a flow of air through the aerodynamic duct 16.

According to a preferred embodiment illustrated in the attached figures, the shutter 19 is mounted revolvingly to rotate about an axis of rotation 20 arranged horizontally and transversally between the engagement position (illustrated in FIG. 3) and the disengagement position (illustrated in FIG. 4). Preferably, the shutter 19 is hinged at the front (with respect to the direction of normal forward movement of the car 1), i.e. the hinge of the shutter 19 is arranged in the area of the front side (with respect to the direction of normal forward movement of the car 1) of the shutter 19.

According to a preferred embodiment illustrated in the attached figures, an elastic element 21 is provided (for example a tape spring) which pushes the shutter 19 towards the engagement position with a calibrated elastic force. The calibrated elastic force generated by the elastic element 21 is such that the aerodynamic pressure of the air on the shutter 19 determines movement of the shutter 19 from the engagement position (illustrated in FIG. 3) to the disengagement position (illustrated in FIG. 4) when the car exceeds a predetermined speed threshold (for example approximately 200-210 km/h). In other words, the shutter 19 is moved by the action of the aerodynamic pressure of the air: when the force generated by the aerodynamic pressure of the air exceeds the force generated by the elastic element 21, the shutter 19 autonomously and automatically moves from the engagement position (illustrated in FIG. 3) to the disengagement position (illustrated in FIG. 4) and vice versa. According to a different embodiment not illustrated, an electric actuator is mechanically coupled to the shutter 19; said actuator actively controls the position of the shutter 19 about the rotation axis 20; in this case the position of the shutter 19 could be controlled in a more refined manner not only according to the forward movement speed of the car 1 but also according to other parameters connected, for example, with stability control of the car 1 or with configurations selected by the driver.

It is useful to observe that the aerodynamic duct 16 is completely free, i.e. inside it is completely devoid of elements that may interfere with (i.e. slow down, disturb) the passage of the air, to allow a flow of air at high speed. In other words, inside the aerodynamic duct 16 no external element is arranged that may interfere with (i.e. slow down, disturb) the passage of the air to maximise the speed of the air through the aerodynamic duct 16.

In the embodiment illustrated in the attached figures, the inlet opening 17 of the aerodynamic duct 16 is obtained through the front bumper 8 and preferably the inlet opening 17 of the aerodynamic duct 16 is obtained through a horizontal wall (i.e. parallel to the road surface 15) of the front bumper 8. Consequently, in the engagement position (illustrated in FIG. 3) the shutter 19 is arranged horizontally (i.e. parallel to the road surface 15).

In the embodiment illustrated in the attached figures, also the outlet opening 18 of the aerodynamic duct 16 is obtained through the front bumper 8. Consequently, the aerodynamic duct 16 is entirely obtained through the front bumper 8, i.e. the aerodynamic duct 16 develops entirely within the front bumper 8.

In the embodiment illustrated in the attached figures, one single aerodynamic duct 16 is provided arranged centrally; in particular, in the embodiment illustrated in the attached figures, the inlet opening 17 of the aerodynamic duct 16 is arranged centrally between the inlet openings 12 of the two ventilation channels 11. According to an alternative and perfectly equivalent embodiment not illustrated, two (or three) distinct and separate aerodynamic ducts 16 symmetrically distributed with respect to the longitudinal axis of the car 1 could be provided.

According to the illustration of FIG. 3, when the shutter 19 is in the engagement position, the inlet opening 17 of the aerodynamic duct 16 is sealed and therefore the air may not flow through the aerodynamic duct 16; in this condition, all the air that impacts against the front bumper 8 contributes to generating lift (aerodynamic load), i.e. contributes to generating on the front bumper 8 a vertical thrust directed downwards which presses the front of the car 1 against the road surface 15. According to the illustration of FIG. 4, when the shutter 19 is in the disengagement position, the inlet opening 17 of the aerodynamic duct 16 is open and therefore the air may flow through the aerodynamic duct 16; in this condition, part of the air that impacts against the front bumper 8 is discharged through the aerodynamic duct 16 without contributing to generating lift (aerodynamic load), i.e. it does not contribute to generating on the front bumper 8 a vertical thrust directed downwards which presses the front of the car 1 against the road surface 15.

Consequently, it is evident that the function of the aerodynamic duct 16 controlled by the shutter 19 is to reduce (slightly) the front aerodynamic load when the car 1 exceeds a predetermined speed threshold; said reduction in the front aerodynamic load serves to "lighten" the steering of the car 1 when the car 1 exceeds a predetermined speed threshold. In this way it is possible to effectively counter the tendency of the steering of the car 1 to become too "heavy" at high speed (indicatively above 200 km/h) and therefore it is possible to improve the steering sensation at high speed.

Thanks to the presence of the aerodynamic duct 16 controlled by the shutter 19 it is possible to obtain an optimal steering sensation at all speeds and without having to accept lowest common denominator compromises. In other words, due to the presence of the aerodynamic duct 16 controlled by the shutter 19, the steering of the car 1 is not too "light" at low speeds and at the same time not too "heavy" at high speed; in fact, at high speed the shutter 19 of the aerodynamic duct 16 opens, reducing (slightly) the front aerodynamic load and therefore "lightening" the steering of the car 1.

Another positive effect made possible by the aerodynamic duct 16 is to balance at high speed the aerodynamic load between the rear axle and the front axle, or give the car 1 a balanced aerodynamic load at all speeds. In other words, as the speed increases, the front aerodynamic load (i.e. the load on the front axle) tends to increase more than the rear aerodynamic load (i.e. the load on the rear axle) and therefore at high speed an unbalance may occur between the front aerodynamic load and the rear aerodynamic load (i.e. at high speed the aerodynamic load is unbalanced towards the front). Thanks to the action of the aerodynamic duct 16, it is possible to contain (reduce) the increase in the front aerodynamic load, favouring correct balancing of the aerodynamic load between the rear axle and the front axle at all speeds. It is important to observe that correct balancing of the aerodynamic load between the rear axle and the front axle allows optimal operation of both the front wheels 2 and the back wheels 3, so that all four wheels 2 and 3 offer the maximum roadholding possible.

A further positive effect made possible by the aerodynamic duct 16 is a (small) reduction in the forward aerodynamic drag of the car 1 at high speed (i.e. when the shutter 19 of the aerodynamic duct 16 opens). In fact, when the shutter 19 of the aerodynamic duct 16 opens, the forward aerodynamic drag of the car 1 decreases (slightly).

It is useful to observe that in the present invention the aerodynamic duct 16 is mainly used to obtain an optimal steering sensation at all speeds and is also used to obtain correct balancing of the aerodynamic load between the rear axle and the front axle and to obtain a reduction in the forward aerodynamic drag of the car 1 at high speed.

Alternatively, the aerodynamic duct 16 could be mainly used to obtain correct balancing of the aerodynamic load between the rear axle and the front axle.

Figure 6:
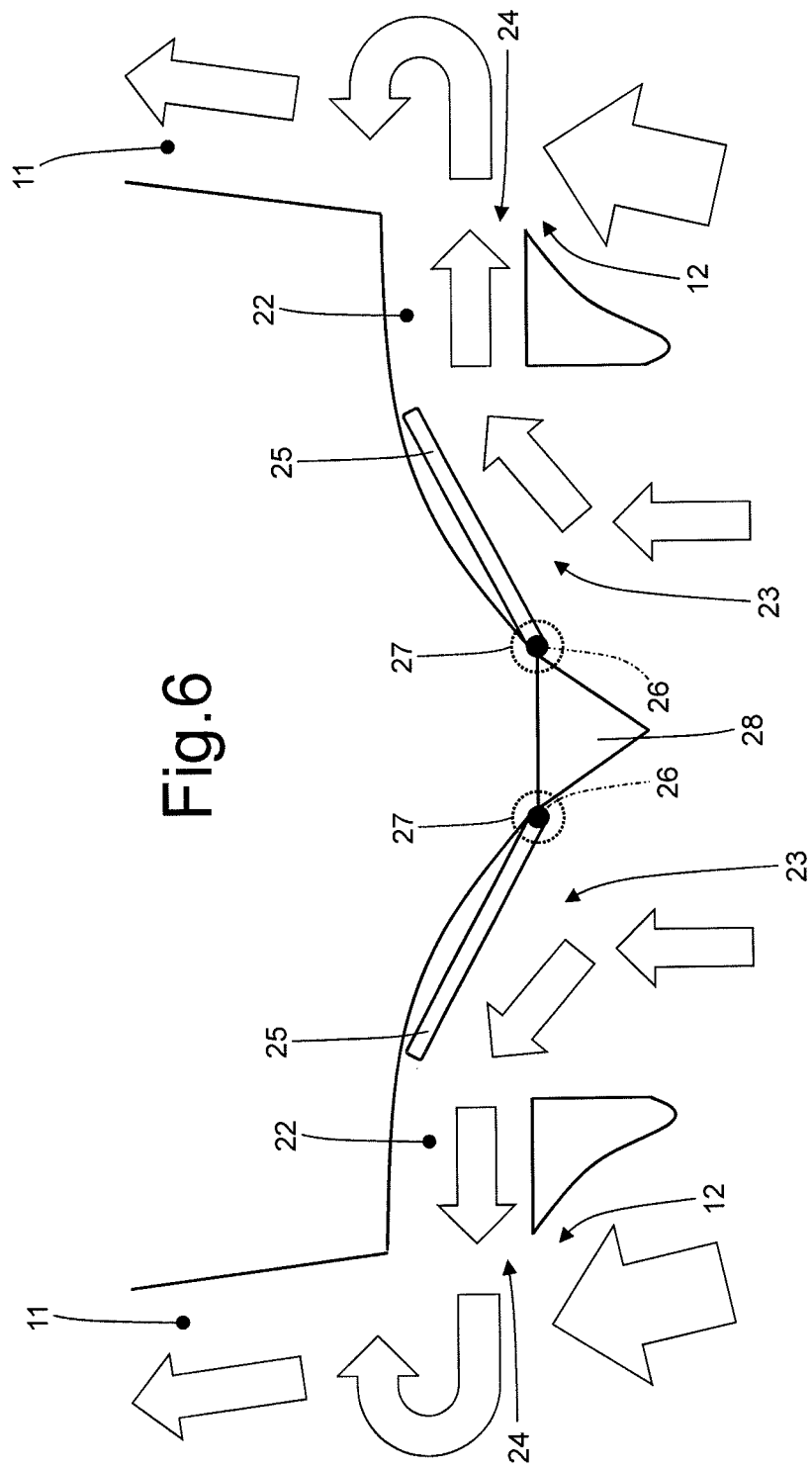
Figure 7:
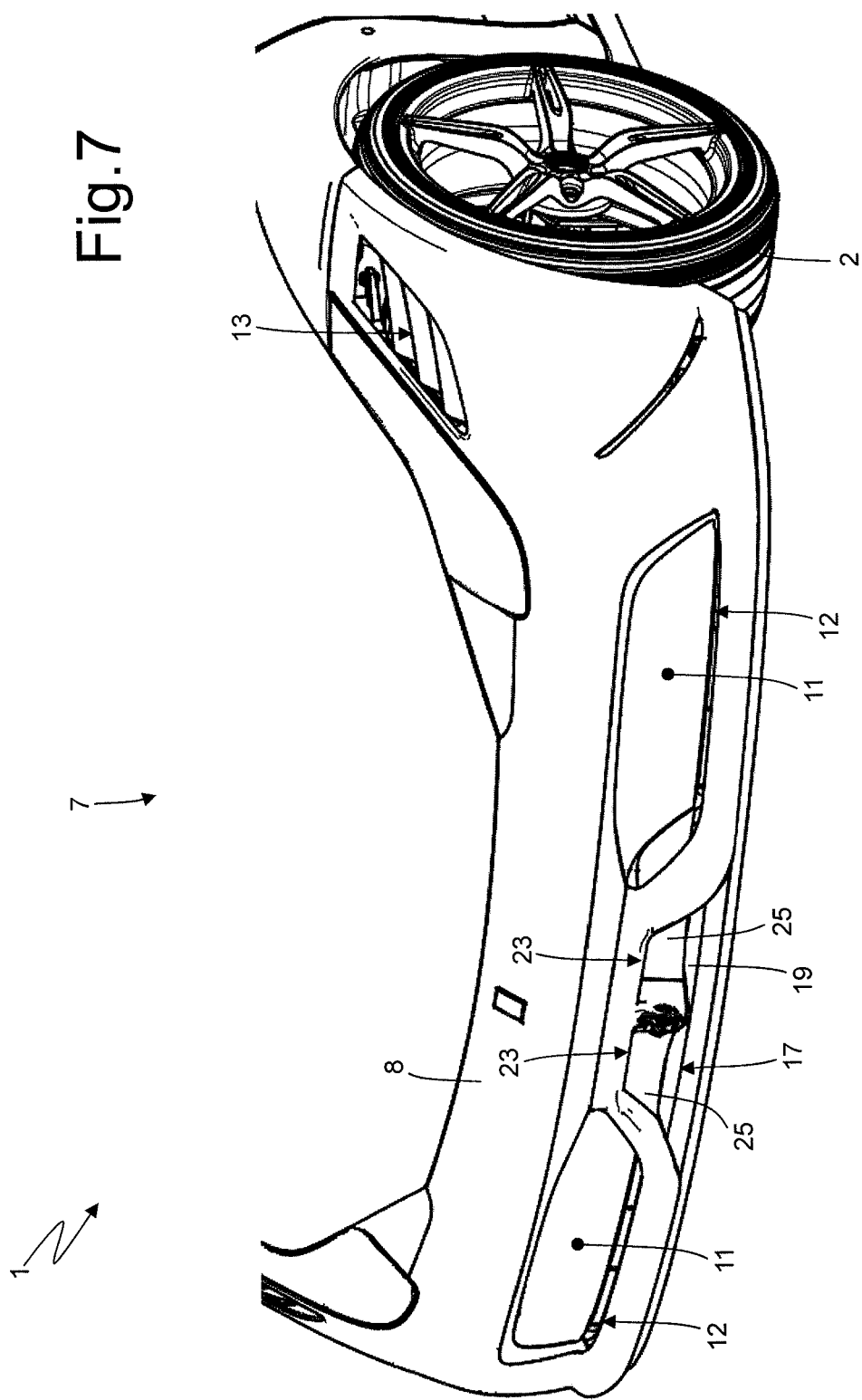
FIGS. 7 and 8 are a perspective view and a front view respectively of a front bumper of a different car produced according to the present invention.
Figure 8:
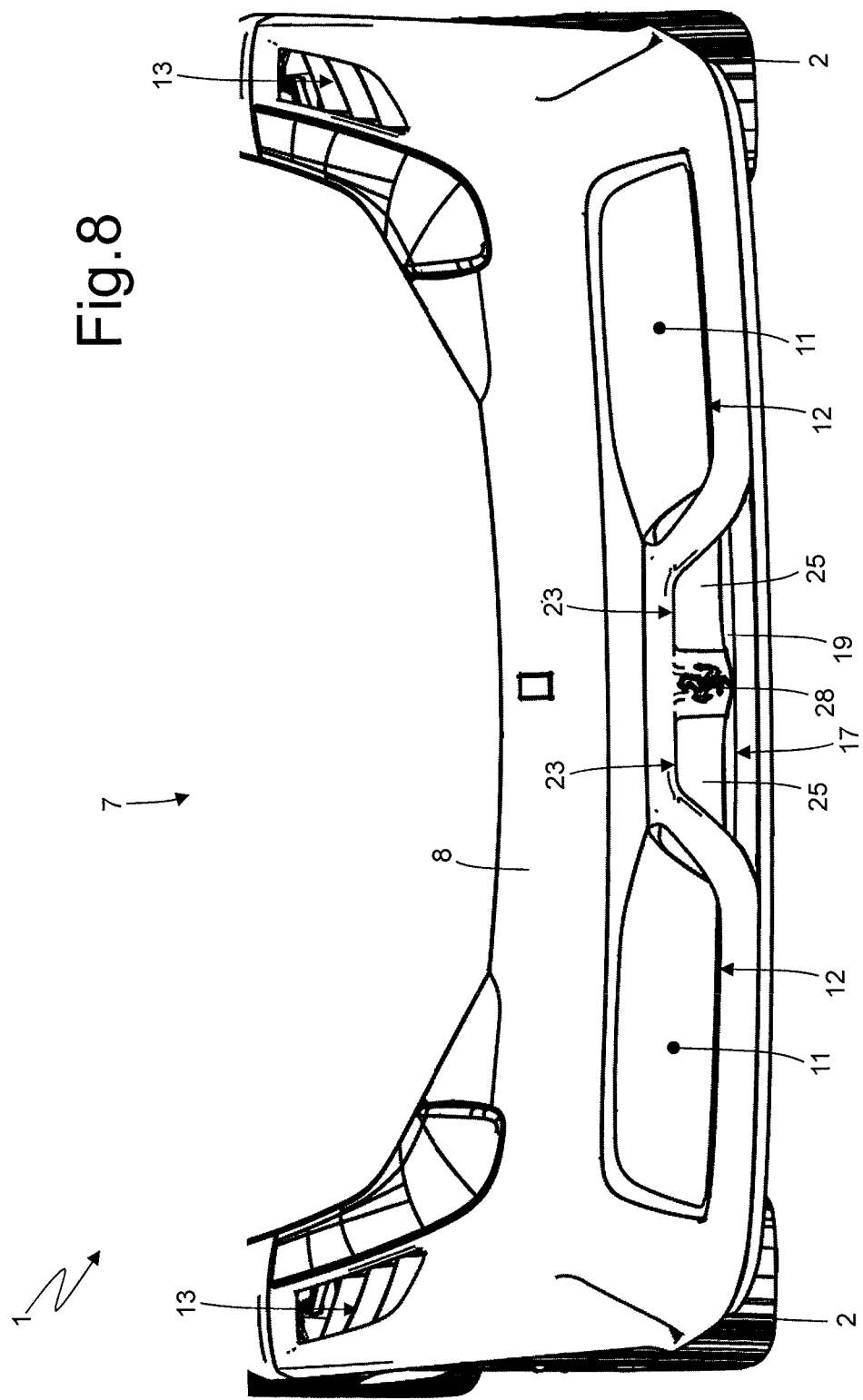

According to the illustrations of FIGS. 5 and 6, each ventilation channel 11 is coupled with a corresponding aerodynamic duct 22 which extends between an inlet opening 23, which is arranged beside the inlet opening 12 of the ventilation channel 11, and an outlet opening 24 obtained inside the ventilation channel 11 between the inlet opening 12 of the ventilation channel 11 and the radiator 10. Furthermore, for each aerodynamic duct 22 a shutter 25 is provided, which is arranged in the area of the inlet opening 23 of the aerodynamic duct 22 and is mounted mobile between an engagement position (illustrated in FIG. 5), in which the shutter 25 closes the inlet opening 23 and therefore prevents a flow of air through the aerodynamic duct 22, and a disengagement position (illustrated in FIG. 6), in which the shutter 25 leaves the inlet opening 23 free and therefore allows a flow of air through the aerodynamic duct 22.

According to a preferred embodiment illustrated in the attached figures, each shutter 25 is mounted revolvingly to rotate about an axis of rotation 26 arranged vertically between the engagement position (illustrated in FIG. 5) and the disengagement position (illustrated in FIG. 6).

According to a preferred embodiment illustrated in the attached figures, for each aerodynamic duct 22 an elastic element 27 is provided (for example a torsion spring) which pushes the shutter 25 towards the engagement position with a calibrated elastic force. The calibrated elastic force generated by each elastic element 27 is such that the aerodynamic pressure of the air on the shutter 25 determines movement of the shutter 25 from the engagement position (illustrated in FIG. 5) to the disengagement position (illustrated in FIG. 6) when the car 1 exceeds a predetermined speed threshold (for example approximately 160-170 km/h). In other words, each shutter 25 is moved by the action of the aerodynamic pressure of the air; when the force generated by the aerodynamic pressure of the air exceeds the force generated by the elastic element 27, the shutter 25 autonomously and automatically moves from the engagement position (illustrated in FIG. 5) to the disengagement position (illustrated in FIG. 6) and vice versa. According to a different embodiment not illustrated, each shutter 25 is mechanically coupled with an electric actuator which actively controls the position of the shutter 25 about the rotation axis 26; in this case the position of the shutter 25 could be controlled in a more refined way not only according to the forward movement speed of the car 1 but also according to other parameters connected, for example, with the effective temperature of the cooling liquid that flows inside the radiators 10.

It is useful to observe that each aerodynamic duct 22 is completely free, i.e. inside it is completely devoid of elements that could interfere with (i.e. slow down, disturb) the passage of the air, to allow a flow of air at high speed. In other words, inside the aerodynamic duct 22 no external element is arranged that could interfere with (i.e. slow down, disturb) the passage of the air in order to maximise the speed of the air through the aerodynamic duct 22.

In the embodiment illustrated in the attached figures, the inlet opening 12 of each ventilation channel 11 and the inlet opening 23 of the corresponding aerodynamic duct 22 are obtained beside each other through the front bumper 8. Preferably, each aerodynamic duct 22 is entirely obtained through the front bumper 8.

In the embodiment illustrated in the attached figures, the outlet opening 24 of each aerodynamic duct 22 is arranged proximately to (in the vicinity of, immediately behind) the inlet opening 12 of the corresponding ventilation channel 11.

According to the preferred embodiment illustrated in the attached figures, the terminal part of each aerodynamic duct 22 in the area of the outlet opening 24 of the aerodynamic duct 22 is oriented transversally to the ventilation channel 11 so that (as illustrated in FIG. 6) the flow of air that flows out of the outlet aperture 24 of the aerodynamic duct 22 is directed transversally to the ventilation channel 11 and is therefore directed transversally to the flow of air that normally flows through the ventilation channel 11.

In the preferred embodiment illustrated in the attached figures, two twin ventilation channels 11 are provided arranged on opposite sides of the car 1 and two aerodynamic ducts 22, each of which leads to the inside of a corresponding ventilation channel 11 and is coupled to a corresponding shutter 25. The inlet openings 23 of the two aerodynamic ducts 22 are arranged beside each other in a central position, i.e. between the inlet openings 12 of the two ventilation channels 11. Preferably, the inlet openings 23 of the two aerodynamic ducts 22 are separated from each other by a separating body 28 with triangular section.

According to the illustration of FIG. 5, when each shutter 25 is in the engagement position, the inlet opening 23 of the aerodynamic duct 22 is sealed and therefore the air may not flow through the aerodynamic duct 22; in this condition, the flow of air through each ventilation channel 11 is devoid of external interferences and therefore it is possible to convey the maximum air flow possible to the inside of the ventilation channel 11. According to the illustration of FIG. 6, when each shutter 25 is in the disengagement position, the inlet opening 23 of the aerodynamic duct 22 is open and therefore the air may flow through the aerodynamic duct 22; in this condition, the aerodynamic duct 22 feeds into the corresponding ventilation channel 11 a flow of "interference" air which is directed transversally to the ventilation channel 11 (i.e. transversally to the normal flow of air through the ventilation channel 11) and has the function of "plugging" the ventilation channel 11 in the vicinity of the inlet opening 12 of the ventilation channel 11. In other words, the flow of "interference" air which is fed from each aerodynamic duct 22 transversally into the ventilation channel 11 generates turbulence which slows down the passage of the air along the ventilation channel 11 thus creating an "aerodynamic plug" inside the ventilation channel 11 (in particular in the vicinity of the inlet opening 12 of the ventilation channel 11). Obviously the "aerodynamic plug" created by the aerodynamic ducts 22 inside the ventilation channels 11 does not completely prevent the flow of air through the ventilation channels 11, but significantly reduces the flow of air flowing through the ventilation channels 11.

Consequently, it is evident that the function of the aerodynamic ducts 22 controlled by the shutters 25 is to reduce the flow rate of the air flowing through the ventilation channels 11 when the car 1 exceeds a predetermined speed threshold; said reduction in the flow rate of the air flowing through the ventilation channels 11 serves to reduce the aerodynamic drag during forward movement of the car 1 when the car 1 exceeds a predetermined speed threshold. In this way it is possible to counter the tendency of the ventilation channels 11 to convey an excessive air flow rate (i.e. oversized for the actual cooling requirements of the radiators 10) at high speed at the expense of the aerodynamic drag during forward movement of the car 1.

Due to the presence of the aerodynamic ducts 22 controlled by the shutters 25 it is possible to guarantee a adequate flow of air through the ventilation channels 11 when the car 1 is at low speed (i.e. when the aerodynamic ducts 22 are closed by the shutters 25) and at the same time it is possible to avoid the ventilation channels 11 conveying an excessive air flow rate (oversized for the actual cooling requirements of the radiators 10) at high speed (i.e. when the aerodynamic ducts 22 are open) at the expense of the aerodynamic drag during forward movement of the car 1.

In the preferred embodiment illustrated in the attached figures, the aerodynamic duct 16 is arranged centrally immediately below the two aerodynamic ducts 22; therefore, and as clearly illustrated in FIG. 2, the shutter 19 of the aerodynamic duct 16 (i.e. the inlet opening 17 of the aerodynamic duct 16) is arranged centrally immediately below the shutters 25 of the aerodynamic ducts 22 (i.e. of the inlet openings 23 of the aerodynamic ducts 22). In particular, the shutter 19 of the aerodynamic duct 16 (i.e. the inlet opening 17 of the aerodynamic duct 16) has a transversal extension which is equal to the transverse extension of both the shutters 25 of the aerodynamic ducts 22 (i.e. of both the inlet openings 23 of the aerodynamic ducts 22). Arrangement of the inlet openings 17 and 23 of the aerodynamic ducts 16 and 22 substantially side by side is particularly advantageous, as it allows optimisation of the volumes and overall dimensions, giving the aerodynamic ducts 16 and 22 appropriate dimensions (i.e. large enough) without negatively affecting in any way the other components of the car 1.

The car 1 described above has numerous advantages.

Due to the action of the aerodynamic duct 16 controlled by the shutter 19 it is possible to obtain an optimal steering sensation at all speeds and therefore without having to accept lowest common denominator compromises.

Due to the action of the aerodynamic ducts 22 controlled by the shutters 25 it is possible to guarantee an appropriate flow of air through the ventilation channels 11 when the car 1 is at low speed without penalizing the aerodynamic drag during forward movement of the car 1 at high speed.

The aerodynamic ducts 16 and 22 may be easily obtained inside the front bumper 8 without negatively affecting in any way the front boot or the other components of the car 1.

The aerodynamic ducts 16 and 22 do not entail any significant increase in weight, since they are "holes" without any weight and the corresponding shutters 19 and 25 are of small size (and therefore also low weight since they may be made of moulded plastic).

Lastly, the car 1 described above is easy and inexpensive to produce, since the aerodynamic ducts 16 and 22 may be easily obtained inside the front bumper 8 when the latter (made of plastic) is injection moulded.

The invention claimed is:

1. A car comprising:
   at least one radiator;
   a ventilation channel, which houses on an inside the radiator and extends between an inlet opening, thorough which fresh air flows in, and an outlet opening, through which hot air flows out;
   a first aerodynamic duct, which extends between an inlet opening, which is arranged next to the inlet opening of the ventilation channel, and an outlet opening, which is obtained inside the ventilation channel between the inlet opening of the ventilation channel and the radiator; and
   a first shutter, which is arranged in correspondence to the inlet opening of the first aerodynamic duct and is mobile between an engagement position, in which the first shutter completely closes the inlet opening of the first aerodynamic duct, and a disengagement position, in which the first shutter leaves the inlet opening of the first aerodynamic duct free;
   wherein an end part of the first aerodynamic duct in correspondence to the outlet opening of the first aerodynamic duct itself is oriented transversely to the ventilation channel so that the flow of air that flows out of the outlet opening of the first aerodynamic duct is directed transversally to the ventilation channel and is therefore directed transversally to the flow of air that normally flows through the ventilation channel to create an aerodynamic plug inside the ventilation channel for reducing the flow rate of the air flowing through the ventilation channel.

2. A car according to claim 1, wherein the first shutter is mounted so as to rotate around a rotation axis between the engagement position and the disengagement position.

3. A car according to claim 2, wherein the rotation axis of the first shutter is arranged vertically.

4. A car according to claim 1 and comprising an elastic element, which pushes the first shutter towards the engagement position with a calibrated elastic force.

5. A car according to claim 4, wherein the calibrated elastic force generated by the elastic element is such that an aerodynamic pressure of the air determines a movement of the first shutter from the engagement position to the disengagement position when the car exceeds a predetermined speed threshold.

6. A car according to claim 4, wherein the elastic element consists of a torsion spring.

7. A car according to claim 1, wherein:
   a car body is provided, which has a front bumper; and
   the inlet opening of the ventilation channel and the inlet opening of the first aerodynamic duct are obtained one next to the other through the front bumper.

8. A car according to claim 7, wherein the first aerodynamic duct is entirely obtained through the front bumper.

9. A car according to claim 1 and comprising:
   two twin ventilation channels, which are arranged on opposite sides of the car; and
   two first aerodynamic ducts, each of which leads to an inside of a corresponding ventilation channel and is coupled to a corresponding first shutter.

10. A car according to claim 9, wherein the inlet openings of the two first aerodynamic ducts are arranged one next to the other in a central position, namely between the inlet openings of the two ventilation channels.

11. A car according to claim 10, wherein the inlet openings of the two first aerodynamic ducts are separated from one another by a separating body with a triangular section.

12. A car according to claim 1, wherein the outlet opening of the first aerodynamic duct is arranged close to the inlet opening of the ventilation channel.

13. A car according claim 1 and comprising:
   a car body which has a front bumper;
   a lower side which delimits the car at a bottom and faces a road surface;
   at least one second aerodynamic duct, which is completely independent and separate from the ventilation channel and from the first aerodynamic duct, extends between an inlet opening, which is arranged frontally in order to be struck by an aerodynamic pressure of the air when the car moves forward, and an outlet opening obtained through the lower side of the car in order to face the road surface; and a second shutter, which is arranged in the area of the inlet opening of the second aerodynamic duct and is mounted mobile between an engagement position, in which the second shutter closes the inlet opening, and a disengagement position, in which the second shutter leaves the inlet opening free.

14. A car according to claim 13 and comprising a second elastic element which pushes the second shutter towards the engagement position with a calibrated elastic force.

15. A car comprising:
   at least one radiator;
   a ventilation channel, which houses on the an inside the radiator and extends between an inlet opening, thorough which fresh air flows in, and an outlet opening, through which hot air flows out;
   an aerodynamic duct, which extends between an inlet opening, which is arranged next to the inlet opening of the ventilation channel, and an outlet opening, which is obtained inside the ventilation channel between the inlet opening of the ventilation channel and the radiator; and
   a shutter, which is arranged in correspondence to the inlet opening of the aerodynamic duct and is mobile between an engagement position, in which the shutter completely closes the inlet opening of the aerodynamic duct, and a disengagement position, in which the shutter leaves the inlet opening of the aerodynamic duct free;
   wherein the shutter is mounted so as to rotate between the engagement position and the disengagement position around a rotation axis arranged vertically.

16. A car comprising:
   at least one radiator;
   a ventilation channel, which houses on the an inside the radiator and extends between an inlet opening, thorough which fresh air flows in, and an outlet opening, through which hot air flows out;
   an aerodynamic duct, which extends between an inlet opening, which is arranged next to the inlet opening of the ventilation channel, and an outlet opening, which is obtained inside the ventilation channel between the inlet opening of the ventilation channel and the radiator;
   a shutter, which is arranged in correspondence to the inlet opening of the aerodynamic duct and is mobile between an engagement position, in which the shutter completely closes the inlet opening of the aerodynamic duct, and a disengagement position, in which the shutter leaves the inlet opening of the aerodynamic duct free; and
   an elastic element, which pushes the shutter towards the engagement position with a calibrated elastic force.

17. A car according to claim 16, wherein the calibrated elastic force generated by the elastic element is such that an aerodynamic pressure of the air determines a movement of the shutter from the engagement position to the disengagement position when the car exceeds a predetermined speed threshold.

18. A car comprising:
   a car body having a front bumper
   at least one radiator;
   a ventilation channel, which houses on the an inside the radiator and extends between an inlet opening, thorough which fresh air flows in, and an outlet opening, through which hot air flows out;
   an aerodynamic duct, which extends between an inlet opening, which is arranged next to the inlet opening of the ventilation channel, and an outlet opening, which is obtained inside the ventilation channel between the inlet opening of the ventilation channel and the radiator; and
   a shutter, which is arranged in correspondence to the inlet opening of the aerodynamic duct and is mobile between an engagement position, in which the shutter completely closes the inlet opening of the aerodynamic duct, and a disengagement position, in which the shutter leaves the inlet opening of the aerodynamic duct free;
   wherein the inlet opening of the ventilation channel and the inlet opening of the aerodynamic duct are obtained one next to the other through the front bumper.

19. A car according to claim 18, wherein the aerodynamic duct is entirely obtained through the front bumper.

20. A car comprising:
   a car body having a front bumper
   two radiators;
   two twin ventilation channels, which are arranged on opposite sides of the car and each of, which houses on the an inside a respective radiator and extends between an inlet opening, thorough which fresh air flows in, and an outlet opening, through which hot air flows out;
   two aerodynamic ducts, each of which extends between an inlet opening, which is arranged next to the inlet opening of a respective ventilation channels, and an outlet opening, which is obtained inside the respective ventilation channel between the inlet opening of the respective channel and the radiator; and
   two shutters, each which is arranged in correspondence to the inlet opening of a respective aerodynamic duct and is mobile between an engagement position, in which the shutter completely closes the inlet opening of the respective aerodynamic duct, and a disengagement position, in which the shutter leaves the inlet opening of the respective aerodynamic duct free.

21. A car according to claim 20, wherein the inlet openings of the two aerodynamic ducts are arranged one next to the other in a central position, namely between the inlet openings of the two ventilation channels.

22. A car according to claim 21, wherein the inlet openings of the two aerodynamic ducts are separated from one another by a separating body with a triangular section.

* * * * *